United States Patent
Shavit (10) Patent No.: US 8,678,072 B2
(45) Date of Patent: Mar. 25, 2014

(54) CUTTING TOOL AND A PROCESS FOR MAKING SUCH A CUTTING TOOL

(75) Inventor: Amos Shavit, Kibbutz Naan (IL)

(73) Assignee: Iscar, Ltd., Tefen (IL)

( * ) Notice: Subject to any disclaimer, the term of this patent is extended or adjusted under 35 U.S.C. 154(b) by 1007 days.

(21) Appl. No.: 12/765,622

(22) Filed: Apr. 22, 2010

(65) Prior Publication Data
US 2010/0272531 A1 Oct. 28, 2010

(30) Foreign Application Priority Data
Apr. 26, 2009 (IL) .......................................... 198375

(51) Int. Cl.
*B22D 17/00* (2006.01)
*B21K 5/04* (2006.01)

(52) U.S. Cl.
USPC .......................................... 164/113; 29/527.5

(58) Field of Classification Search
USPC .......................................... 164/113; 29/527.5
See application file for complete search history.

(56) References Cited

U.S. PATENT DOCUMENTS

| | | | |
|---|---|---|---|
| 6,274,082 B1 | 8/2001 | Nagahora et al. | |
| 6,450,739 B1 | 9/2002 | Puide et al. | |
| 6,511,265 B1 | 1/2003 | Mirchandani et al. | |
| 6,669,414 B1 | 12/2003 | Puide et al. | |
| 7,296,497 B2 | 11/2007 | Kugelberg et al. | |
| 7,340,978 B2 | 3/2008 | Kugelberg et al. | |
| 2006/0027046 A1 | 2/2006 | Kugelberg et al. | |

FOREIGN PATENT DOCUMENTS

| DE | 86 28 857 | 11/1988 |
|---|---|---|
| JP | 48 041371 | 6/1973 |
| JP | 48 044875 | 6/1973 |

OTHER PUBLICATIONS

Office Action dated Dec. 8, 2011 issued in counterpart Israeli application (No. 198375).
International Search Report PCT/IL2010/000296, dated Aug. 11, 2010.
Office Action dated Dec. 8, 2011 issued in counterpart Israeli application (No. 24959).

*Primary Examiner* — Kevin P Kerns
(74) *Attorney, Agent, or Firm* — Womble Carlyle (57) ABSTRACT

A cutting tool having a monolithic construction includes an injection molded shank, and an extruded fluted portion extending forwardly from the shank, the shank and the fluted portion having a monolithic construction. The process for making the cutting tool includes forming a cutting tool green body by injection molding a shank of the green body and extruding a fluted portion of the green body such that the shank and the fluted portion have a monolithic construction; and then sintering the cutting tool green body.

25 Claims, 7 Drawing Sheets

CUTTING TOOL AND A PROCESS FOR MAKING SUCH A CUTTING TOOL

FIELD OF THE INVENTION

The present invention relates to the field of cutting tools that are made by a continuous and uninterrupted injection and extrusion process, and more specifically, to the field of drills that are made by such an injection and extrusion process.

BACKGROUND OF THE INVENTION

The use of an extrusion process for the production of cutting tools made of cemented carbide is known. There are several types of cutting tools that may be produced by such a process, e.g., drills, end mills, reamers, taps, as well as countersinking and counterboring tools. The required cutting tool may be extruded to the desired diameter and length, and then, the necessary chip evacuation flutes are produced.

In some cases, the chip evacuation flutes may be parallel to a longitudinal axis of the cutting tool, as required, for example, in some kinds of reamers. In other cases, the chip evacuation flutes may extend spirally around the longitudinal axis, as required, for example, in other kinds of reamers, and in end mills and drills.

Each of the cutting tools may be provided with an internal cooling channel that extends from its rear portion to its front portion in order to supply cooling liquid to the cutting area. When the cutting tool is provided with helical chip evacuation flutes then, typically, also the cooling channels extend spirally around the longitudinal axis, following the helix of the flutes.

Each of the above described cutting tools comprises a shank portion, in a rear portion thereof, and, a fluted portion extending forwardly from the shank portion. The shank portion is typically in the form of a round rod and serves for holding the cutting tool by a cutting machine or by an adapter.

There are known various methods for the production of the helical flutes and for the production of the spiral cooling channels.

U.S. Pat. No. 6,669,414 to Puide teaches how to manufacture a helix drill by extruding a blank and then sintering the blank. During the extrusion, a mixture is passed through a die which provides a cylindrical shape to the outer peripheral surface of the mixture. A plurality of jaws are disposed downstream of the die for conducting the mixture. Each jaw includes a helical ridge for engaging the outer surface of the extruded material to cause a helical groove to be formed therein which constitutes a chip flute in the tool. During the extrusion, the jaws are moved away from the mixture to terminate formation of the chip groove, whereby a shank portion of the tool is formed. In order to transfer flushing medium from the spindle to the tip of the drill, two flush channels extend through the entire drill.

Another method for producing a drill blank is disclosed in U.S. Pat. No. 7,296,497 to Kugelberg et al. The method comprising extruding a first blank portion (B1) having a free end and external flutes, allowing the extrusion to continue to supply further extruding mass into a cavity (6), the supply completely fills out the external flutes of the first blank portion (B1) to produce a second blank portion (B2) integral with the first blank portion (B1), allowing the extrusion to continue to produce a desired length of the first blank portion (B1), and cutting off the first blank portion (B1) at the end facing away from the second blank portion (B2).

Another method for producing a drill blank is disclosed in U.S. Pat. No. 7,340,978 to Kugelberg et al. The method comprising extruding a mixture in a feed direction by means of a die to form the diameter of the mixture body. The mixture body passes against a chisel which forms a chip flute in the outer periphery of the mixture body by chip-removing machining When the chisel is displaced away from the mixture body, a non-fluted shaft portion is formed. By rotating the mixture body while contacted by the chisel, a helical chip flute can be formed. Alternatively, the body could be twisted after a straight flute has been formed, whereupon the flute becomes helical.

In some cases, it is beneficial to produce a cutting tool from regions having a different structure. Regions having different structures means that they differ by their qualities, for example, one region, typically a peripheral one, may be more wear resistant, whilst another region, typically an inner one, may be tougher and less brittle.

The properties of the cemented carbide materials are determined by, for example, the chemical composition of the ceramic component, the particle size of the ceramic component, the chemical composition of the binder, and the ratio of binder to ceramic component. The different characteristics of the different regions may be differences in; modulus of elasticity, hardness, wear resistance, fracture toughness, tensile strength, corrosion resistance, coefficient of thermal expansion, and coefficient of thermal conductivity.

Methods for producing cutting tools having regions of a different structure are known in the art. Such methods are disclosed, for example, in U.S. Pat. No. 6,511,265 to Mirchandani et al., in U.S. Pat. No. 6,450,739 to Puide et al. and in U.S. Pat. No. 6,274,082 to Nagahora et al. However, in a co-extrusion method, which is a composite technique for a molten metal material, an entire surface of a first material is covered with a second material. Thus, even unnecessary parts are covered, and the characteristics of the first material cannot sufficiently be exhibited. This may be disadvantageous from the standpoint of costs.

SUMMARY OF THE INVENTION

In accordance with the present invention there is provided a cutting tool comprising: an injection molded shank, and an extruded fluted portion extending from the injection molded shank, wherein the injection molded shank and the extruded fluted portion have a monolithic construction.

In accordance with preferred embodiments, the shank comprises a bore extending forwardly from a rear end of the shank.

In accordance with some embodiments, the bore is cylindrical and symmetrical with respect to a longitudinal axis of the cutting tool.

In accordance with other embodiments, the bore has a non-round cross-section taken in a plane perpendicular to a longitudinal axis of the cutting tool.

In accordance with some embodiments, the shank has a shank diameter D3; the bore has a bore diameter D4; and
a diameter ratio E between the bore diameter D4 and the shank diameter D3 is in the range of 0.6 to 0.9.

If desired, the fluted portion comprises at least one internal cooling channel that extends forwardly from a front end of the bore.

In some embodiments, the bore is straight; and
at least one internal cooling channel extends forwardly from a front end of the bore.

In some embodiments, the bore is twisted; and
at least one twisted cooling channel extends forwardly from a front end of the bore.

In some embodiments, the fluted portion comprises at least one internal cooling channel having a non-round cross-section taken in a plane perpendicular to a longitudinal axis C of the cutting tool.

Advantageously, the fluted portion comprises at least one flute peripheral portion having a flute leading edge at a leading end of the flute peripheral portion, and a flute trailing edge at a trailing end of the flute peripheral portion; and the fluted portion comprises at least one internal cooling channel that is closer to the flute leading edge than to the flute trailing edge, as seen in a cross-section taken in a plane perpendicular to a longitudinal axis C of the cutting tool.

Further advantageously, the fluted portion comprises at least one flute peripheral portion having a flute leading edge at a leading end of the flute peripheral portion, and a flute trailing edge at a trailing end of the flute peripheral portion; and the tool material of the fluted portion adjacent the flute peripheral portion has different properties with respect to the tool material of the fluted portion remote from the flute peripheral portion.

Still further advantageously, the fluted portion comprises at least one flute peripheral portion having a flute leading edge, at a leading end of the flute peripheral portion, and, a flute trailing edge, at a trailing end of the flute peripheral portion; and the tool material of the fluted portion adjacent the flute leading edge has different properties with respect to the tool material of the fluted portion remote from the flute leading edge.

If desired, the shank is made of a first material having first material properties; and at least a portion of the fluted portion is made of a second material having second material properties that differ from the first material properties.

In some embodiments, the fluted portion comprises a cutting head; and at least the cutting head is made of the second material.

In some embodiments, at least a portion of a length of the fluted portion is made of a harder material than a remaining portion of the length of the fluted portion.

If desired, the shank has a shank diameter D3;
the fluted portion has a fluted portion diameter D5; and
the shank diameter D3 differs from the fluted portion diameter D5.

In some embodiments, the cutting tool comprises a cutting portion in a front portion of the cutting tool; and
the cutting portion extends radially outwardly from the fluted portion.

There is also provided in accordance with the present invention a process for making a cutting tool having a shank and a fluted portion comprising the steps of:
forming a cutting tool green body by:
injection molding a shank of the green body; and
extruding a fluted portion of the green body such that the shank and the fluted portion have a monolithic construction; and
sintering the green body.

The process may include:
prior to forming the cutting tool body, providing an injection and extrusion system (10) comprising:
a fixed portion; and
a movable portion that contacts the fixed portion and is capable of moving away from the fixed portion along a bidirectional movement direction; wherein:
one of the fixed and movable portions comprises a die having a die bore with a longitudinal axis, the die bore facing along the movement direction; and
the other of the fixed and movable portions comprises a cavity insert having a longitudinal axis and an insert bore that faces the die bore;
and wherein:
forming the cutting tool green body comprises:
(i) injecting molten tool material through the die bore and into the insert bore, thus forming a shank of the cutting tool green body;
(ii) moving the movable portion away from the fixed portion, and, simultaneously, extruding molten tool material through the die bore, thus forming a desired length of a fluted portion of the cutting tool green body, such that the shank and the fluted portion have a monolithic construction; and
(iii) cutting the fluted portion by a blade.

The blade may cut in a direction perpendicular to the movement direction.

The process may comprise the further step of ejecting the shank from the insert bore prior to sintering the cutting tool green body.

Typically, the insert bore comprises a core that extends rearwardly from an insert bore bottom.

Generally, the core has a core diameter D1;
the insert bore has a cavity diameter D2; and
a diameter ratio E between the core diameter D1 and the cavity diameter D2 is in the range of 0.6 to 0.9.

In some embodiments, the die bore comprises die bore portions that are twisted along the die bore; and
the cavity insert is rotatable around its longitudinal axis B, with respect to whichever of the fixed portion and the movable portion it belongs.

If desired, the cavity insert is forcibly rotatable.

In some embodiments, the die bore comprises at least one pin that extends rearwardly from a forward portion of the die bore.

If desired, the at least one pin is twisted at least along a front portion thereof.

Advantageously, a cross-section of the at least one pin, taken in a plane perpendicular to the longitudinal axis A of the die bore, is not round.

In some embodiments, the die bore comprises a die bore peripheral portion associated with the at least one pin;
the die bore peripheral portion merges with a first die bore convex portion at a first bore edge and with a second die bore convex portion at a second bore edge; and
the at least one pin is closer to the first bore edge than to the second bore edge.

Advantageously, the die bore comprises a die bore peripheral portion associated with the at least one pin;
the die bore peripheral portion merges with a first die bore convex portion at a first bore edge and with a second die bore convex portion at a second bore edge;
a first chamber is defined between the die bore peripheral portion and a separation plate;
a second chamber is defined between the separation plate and the longitudinal axis A of the die bore; and
the first chamber is connected to an intake of a first tool material and the second chamber is connected to an intake of a second tool material.

If desired, the first tool material is different from the second tool material.

Further if desired, the first tool material is harder than the second tool material; and the second tool material is tougher than the first tool material.

In some embodiments, at least a portion of a length of the fluted portion is made from the first tool material and a remaining portion of the length of the fluted portion is made from the second tool material.

Advantageously, the separation plate is connected to the at least one pin.

In some embodiments, the first chamber comprises the first bore edge and the second bore edge.

In some embodiments, the first chamber comprises the first bore edge; and the second chamber comprises the second bore edge.

If desired, the first chamber comprises the at least one pin.

Further if desired, the second chamber comprises the at least one pin.

Typically, the insert bore has a cavity bore diameter D2; the die bore has a die bore diameter D6; and
the cavity bore diameter D2 equals the die bore diameter D6.

In some embodiments, the insert bore has a cavity bore diameter D2;
the die bore has a die bore diameter D6; and
the cavity bore diameter D2 differs from the die bore diameter D6.

In some embodiments, the fixed portion comprises the die and the movable portion comprises the cavity insert. In other embodiments, the fixed portion comprises the cavity insert and the movable portion comprises the die.

There is also provided in accordance with the present invention a process for making a cutting tool green body having a shank and a fluted portion comprising the steps of:
 injection molding a shank of the green body; and
 extruding a fluted portion of the green body such that the shank and the fluted portion have a monolithic construction.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
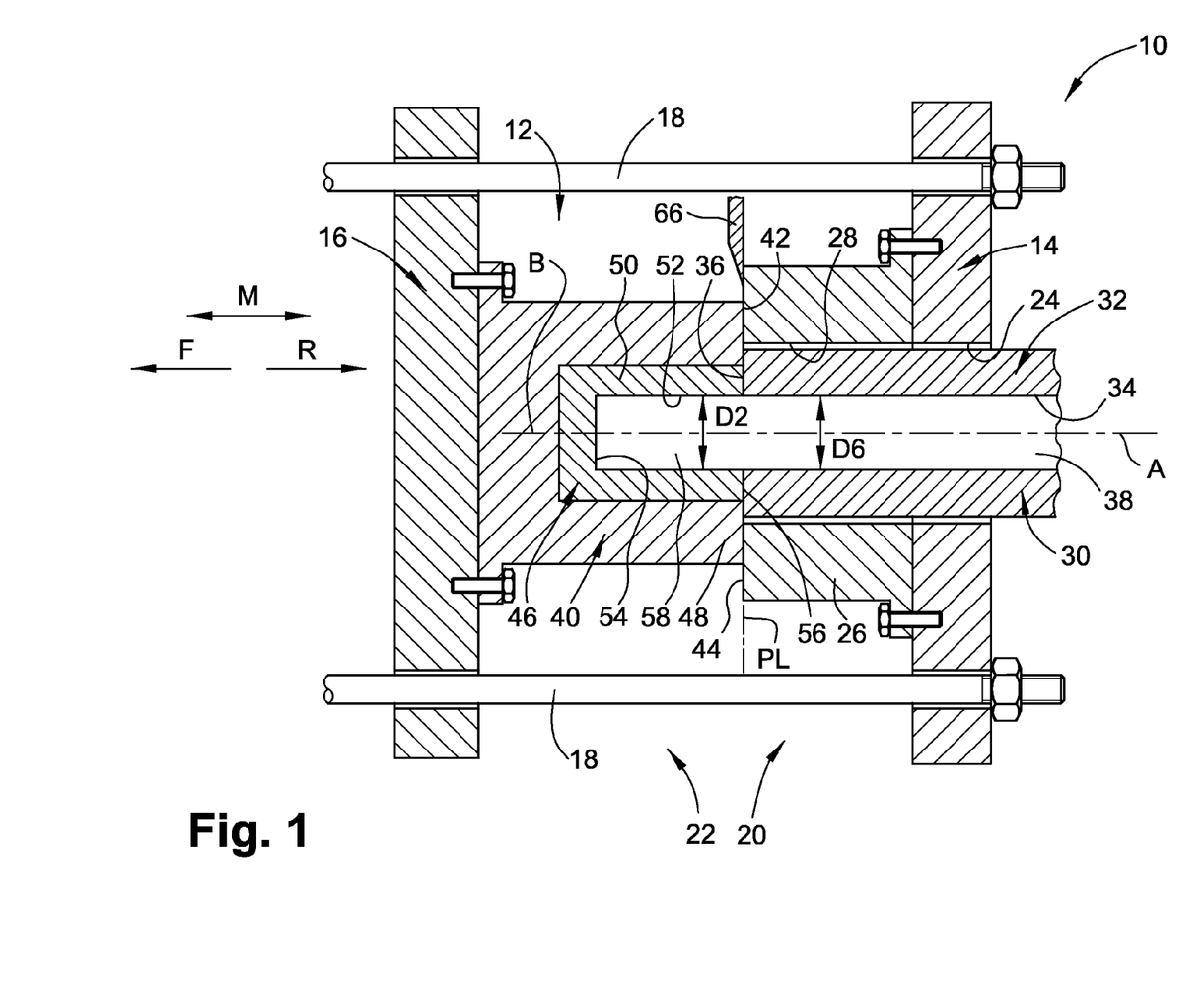
FIG. 1 is a schematical cross-sectional view of an injection and extruding system in accordance with the present invention during the injection process.

Attention is first drawn to FIG. 1, showing an injection and extruding system 10 in accordance with the present invention. The injection and extruding system 10 (hereinafter referred to as the "system") comprises basic components of an injection machine 12 as known in the art. However, the system 10 provides a process of manufacturing a product that combines both an injection molding process and an extrusion process as will be later described. For the sake of clarity, it should be understood that the term an "injection machine" is also known as an "injection molding machine" where molten material is injected into a cavity of a mold.

The system 10 comprises a fixed plate 14 that is connected to a movable plate 16 by means of tie bars 18. Typically, the system 10 comprises four tie bars 18 that are parallel to each other and enable sliding of the movable plate 16 along a bidirectional movement direction M that is perpendicular to the fixed plate 14.

The system 10 is not limited to comprise four tie bars 18 and another number of tie bars may be used. Thus, in some embodiments, the system 10 may comprise two tie bars. Furthermore, according to other embodiments, the injection machine 12 may operate in a different manner, and, without tie bars.

The fixed plate 14 serves as a base for various parts that form a fixed portion 20 of the system 10. Likewise, the movable plate 16 serves as a base for various parts that form a movable portion 22 of the system 10. When the movable portion 22 joins the fixed portion 20, they join at a parting line PL. The parting line PL lies in a plane that is perpendicular to the movement direction M. The direction from the fixed plate 14 toward the movable plate 16 forms a forward direction F of the system 10, wherein an opposite direction forms a rearward direction R of the system 10.

The fixed plate 14 is provided with a centrally located fixed plate bore 24. A mold fixed portion 26, forming a part of the fixed portion 20, is connected to the fixed plate 14 and extends forwardly therefrom. The mold fixed portion 26 is provided with a centrally located fixed mold bore 28 that extends coaxially with the fixed plate bore 24.

A die 30 is located, and may have a sliding contact, within the fixed mold bore 28 and the fixed plate bore 24. The die 30 has a die body 32 and a centrally located die bore 34, having a longitudinal axis A, that extends rearwardly from a die front end 36. The die 30 extends from the die front end 36, that reaches the parting line PL, and rearwardly beyond the fixed plate 14. It is understood by a person skilled in the art that, when the injection machine 12 comprises an injection unit having a cylinder (not shown), the die 30 may be connected to the cylinder of the injection unit of the injection machine 12. Alternatively, the die 30 may form a part of the mold fixed portion 26.

The die 30 is provided with a plurality of heating elements (not shown). The heating elements may be located within the die body 32 or outwardly therefrom. The heating elements heat tool material 38 located in the die bore 34 up to an extrusion temperature T1.

According to the present invention, the tool material 38 comprises cemented carbides with the addition of a binder as known in the art. However, the present invention is not limited to the use of cemented carbides only and other tool materials may be used for producing cutting tools. Such materials may be, for example, ceramic, steel, HSS or the like.

As is known to those skilled in the art, the tool material may be feed into a hopper (not shown) and pressed towards the die bore 34 by means of a single or twin screw auger (not shown), powered by an electric or hydraulic motor (not shown), or a ram (not shown), driven by hydraulic pressure or electrical means.

A mold moving portion 40, forming a part of the movable portion 22, is connected to the movable plate 16 and extends rearwardly therefrom. At the position shown in FIG. 1, the mold moving portion 40 extends rearwardly up to the parting line PL and a moving portion rear end 42 abuts the die front end 36 and a fixed mold front end 44 of the mold fixed portion 26.

A cavity insert 46, having a longitudinal axis B, is located in a moving portion rear section 48 of the mold moving portion 40. The cavity insert 46 has an insert body 50 and a centrally located insert bore 52 having an insert bore bottom 54. The insert bore 52 extends rearwardly from the insert bore bottom 54 and opens to an insert rear face 56 that, at the position shown in FIG. 1, abuts the die front end 36 at the parting line PL. The longitudinal axis B of the cavity insert 46 is coaxial with the longitudinal axis A of the die bore 34. The cavity insert 46 is held at a cavity temperature T2 and it serves as a mold 58 into which the shank 60 of the cutting tool 62, having a longitudinal axis C, is injected and formed.

The cavity insert 46 is rotatable with respect to the mold moving portion 40 around the longitudinal axis B of the cavity insert 46. The cavity insert 46 may be freely rotated, or, forcibly rotated by means of an electric motor, hydraulic motor, and the like (not shown in the figures).

In one embodiment, a continuous and uninterrupted process for making a cutting tool according to the present invention involves both an injection stage and an extrusion stage. The process for making a cutting tool may comprise the following steps:

At the first step, molten tool material 38 is injected through the die 30 and into the cavity insert 46 in an injection process (sometimes referred to as "injection molding") as known in the art. At this stage, as shown in FIG. 1, the mold moving portion 40 is forcibly held against the die 30 and the mold fixed portion 26 along the parting line PL. The cavity insert 46 is maintained at the cavity temperature T2 that is lower than the extrusion temperature T1 by which the tool material 38 is held within the die bore 34.

The molten tool material 38, being pressed with high pressure and temperature, fills the insert bore 52 and thus is formed in the shape of the desired shank 60 of the cutting tool 62. At this stage, the shank 60 cools down to the cavity temperature T2 and starts to solidify wherein the system 10 is ready for the next step, namely, the extrusion of the fluted portion 64.

Figure 2:
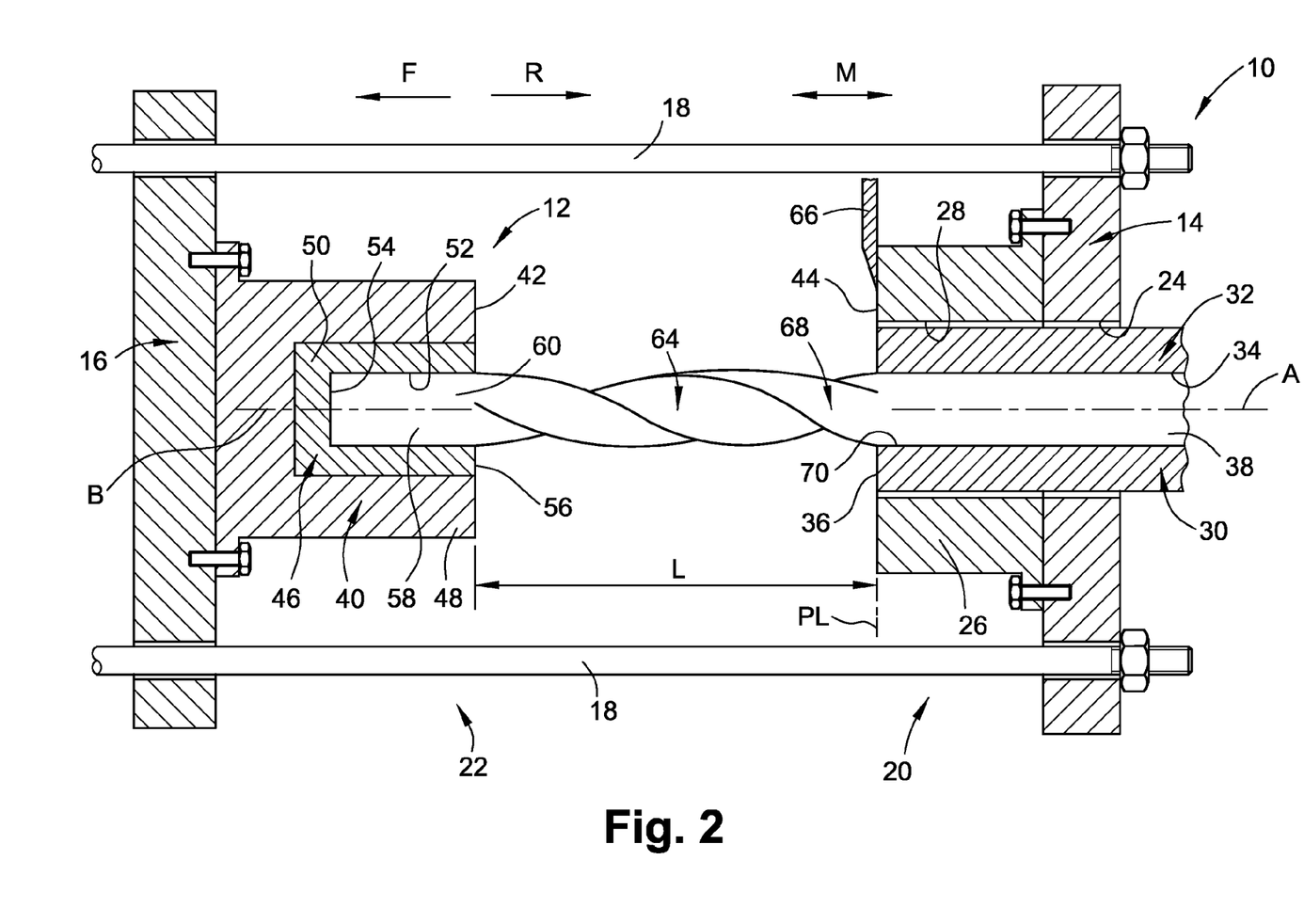
FIG. 2 is a schematical cross-sectional view of an injection and extruding system in accordance with the present invention during the extrusion process.

At this stage, as shown in FIG. 2, two simultaneous actions take place. First, the movable plate 16 is moved forwardly so that the movable portion 22 is separated from the fixed portion 20 at the parting line PL and away from the die 30. Second, molten tool material 38 is extruded through the die 30.

When a desired length L of the fluted portion 64 has been reached, the extrusion of the molten tool material 38 through the die 30 is stopped, the forward movement of the movable plate 16 is stopped, and a blade 66 cuts the green body 68 of the cutting tool 62 along the parting line PL, in a direction perpendicular to the longitudinal axis A of the die bore 34.

In accordance with some embodiments, the fluted portion 64 may be straight. In accordance with other embodiments, the fluted portion 64 may be twisted as shown in FIG. 2.

When straight flutes are required, the die bore 34 has the shape of the cross section of the fluted portion 64, at least along a forward portion 70 of the die bore 34. This shape may be constant along a given length of the die bore 34.

When twisted flutes are required, as shown for example in FIG. 2, the die bore 34 has the shape of the cross section of the fluted portion. This shape is twisted along a given length of the die bore 34, at least along a forward portion 70 of the die bore 34.

Thus, in the example shown in FIG. 2, the fluted portion 64 is extruded from the die 30 in a twisted manner The movable portion 22 is moved forwardly at a speed that corresponds to the rate of extrusion of the molten tool material 38 through the die 30.

Since the fluted portion is extruded in a twisted manner, the shank 60 also has to be rotated in order not to break the green body 68 of the cutting tool 62. Therefore, the cavity insert 46 may be freely rotated, or, it may be constrained to rotate at the desired speed by means of an electric motor, hydraulic means, or the like.

Clearly, if the cutting tool 62 is produced with straight flutes, then, the shank 60 does not have to be rotated with the fluted portion, and, therefore, also the cavity insert 46 does not have to be rotated with respect to the mold moving portion 40.

At the final step of the process for the production of a green body, the green body 68 of the cutting tool 62 is ejected from the cavity insert 46, and, the movable portion 22 is moved rearwardly to lie against the fixed portion 20 to be ready for the next cycle of injection and extrusion for producing another green body 68 of a cutting tool 62.

As a final production stage of the cutting tool 62, the green body 68 may be sintered and the final shape and size of the shank 60, the fluted portion 64, and a cutting head 72 in a front portion 74 of the cutting tool 62 may be produced by, for example, a grinding process.

Thus, the resulting cutting tool 62 comprises an injection molded shank 60 and an extruded fluted portion 64 having a monolithic construction, the term "monolithic" referring to the fact that the shank and the fluted portion of the cutting tool have unitary, one-piece construction and were not formed as discrete members which later were joined together. Similarly, in the green body, the shank and the fluted portion also have a monolithic construction, the green body being formed as one piece in a single continuous and uninterrupted production process.

Throughout the specification and claims reference is made to the phrase "sintering" with regard to the green body. However, it is understood by a person skilled in the art that the process of forming a green body, which is typically soft and brittle, into a solid hard body may comprise other stages like, for example, chemical debinding and thermal debinding.

In the described embodiment, reference is made to directions as "forwardly" and "rearwardly" which relate to a process that takes place in a horizontal direction. However, the process for making a cutting tool according to the present invention is not limited to a horizontal direction only and other spatial directions may be chosen. For example, the injection and extrusion may take place in a vertical direction, i.e., in a direction that is perpendicular to ground.

Figure 4:
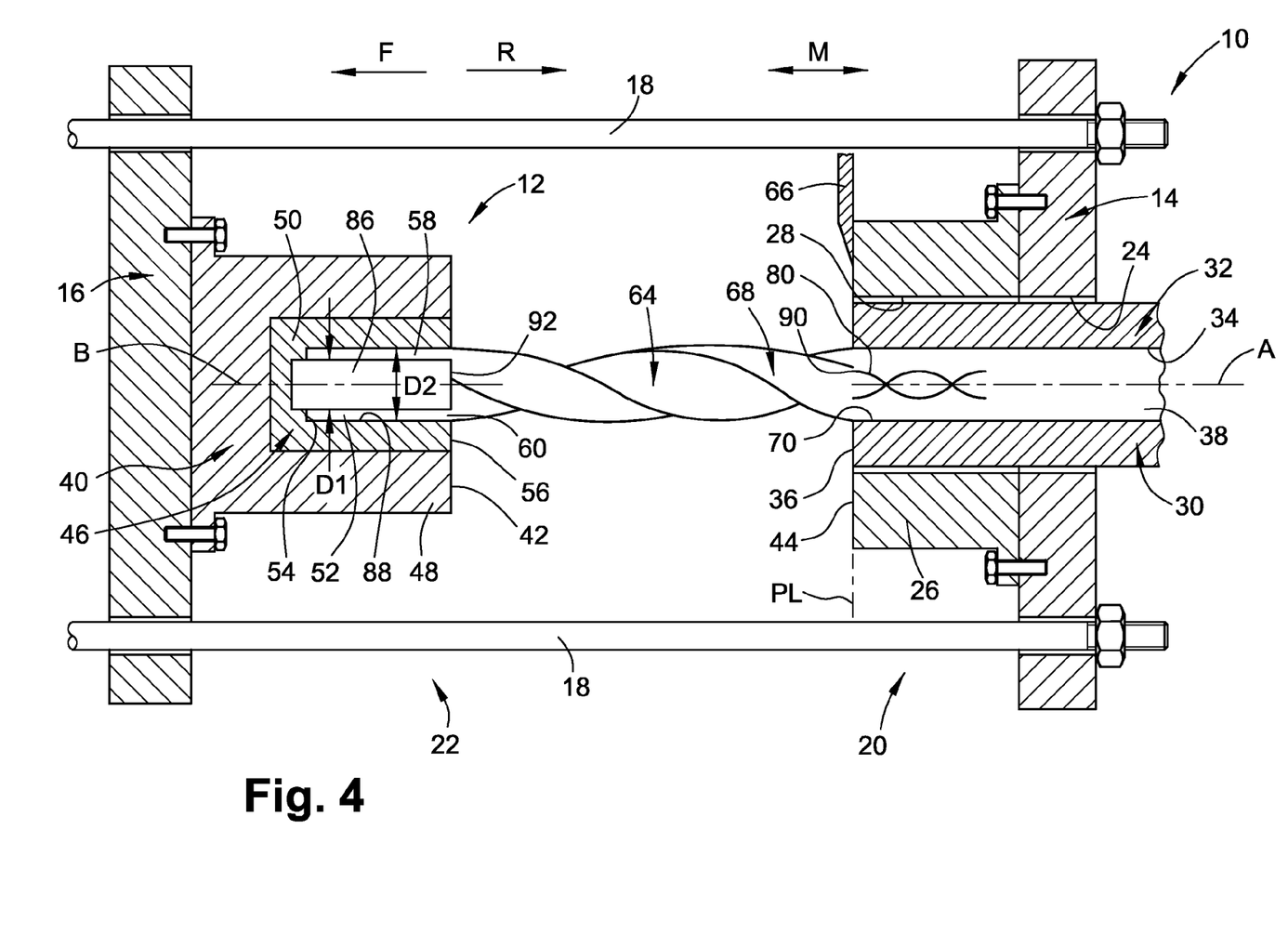
FIG. 4 is a schematical cross-sectional view of an injection and extruding system in accordance with the present invention during the extrusion process of producing a cutting tool having cooling channels and a shank bore.
Figure 5:
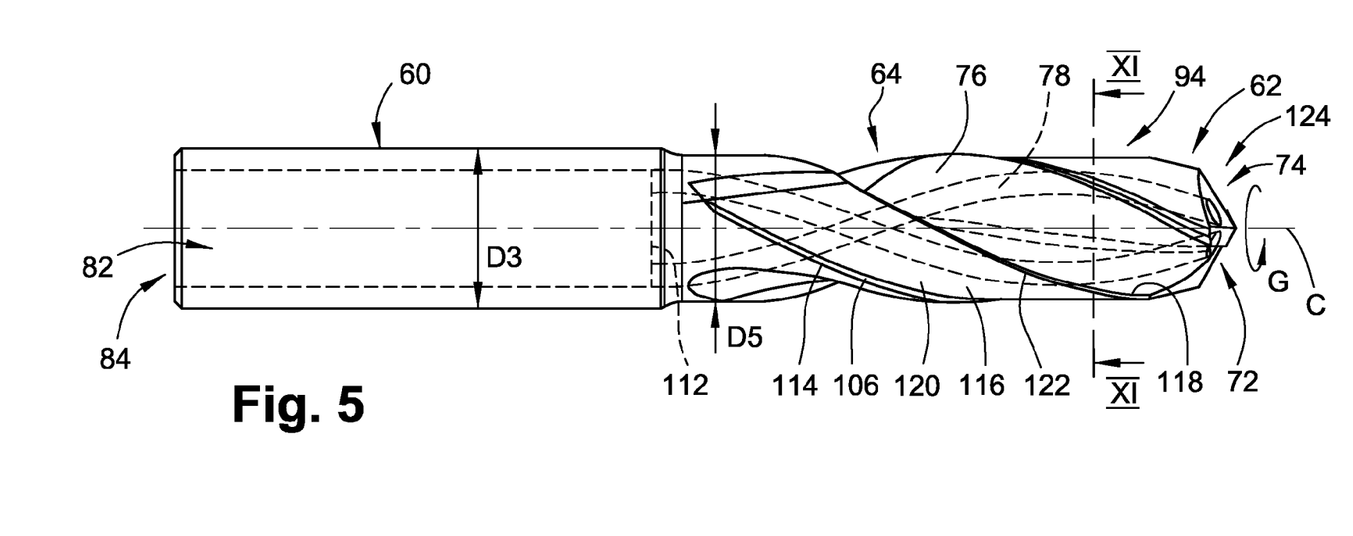
FIG. 5 is a side view of a cutting tool produced by the injection and extrusion system according to the present invention.
Figure 6:
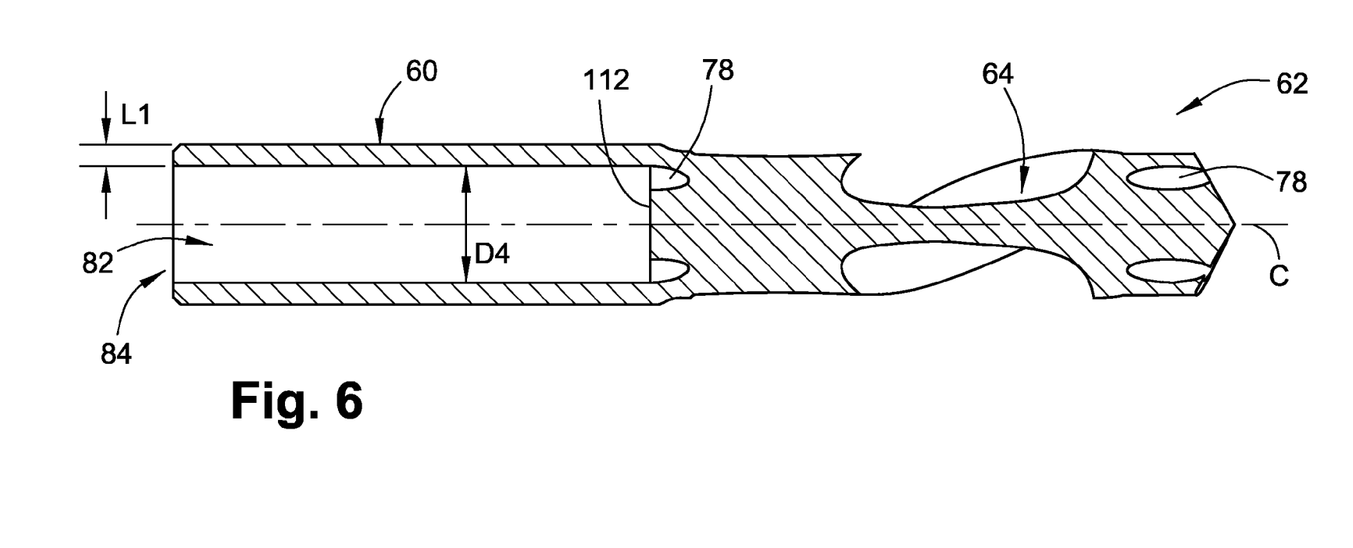
FIG. 6 is a longitudinal cross-section of the cutting tool of FIG. 5.

Furthermore, care must be taken with regard to the forward and rear directions as defined with respect to the process (FIGS. 1 to 4) which are oppositely defined with relation to the cutting tool (FIGS. 5 and 6). Hence, in the injection and extrusion system 10, the cavity insert 46, for producing the shank 60, is located forwardly to the die 30, for producing the fluted portion 64, whereas, at the cutting tool 62, the fluted portion 64 extends forwardly from the shank 60.

After the injection of the shank 60, the fluted portion 64 may be extruded to any desired length and is limited, practically, only by the length of the machine, namely, the length in which the movable portion 22 can be distanced from the fixed portion 20.

The die 30 is formed in a shape that corresponds to the shape of a cross-section of the fluted portion 64 of the cutting tool 62. The size of the fluted portion 64 of the green body, as obtained through the extrusion, is such that after sintering the green body, its size may be similar to the final size of the fluted portion 64 of the cutting tool 62, or, if desired, slightly larger therefrom in order to enable grinding of the flutes 76 to the exact desired shape and size. Thus, by having the flutes 76 made at, or almost at, their final shape and size after the sintering stage, a considerable amount of time and money is saved by this process.

The process for making a cutting tool as described above may be implemented to cutting tools having straight flutes, for example, some kinds of reamers or deep hole drills, or, to cutting tools having twisted flutes, like drills and end mills.

Figure 3:
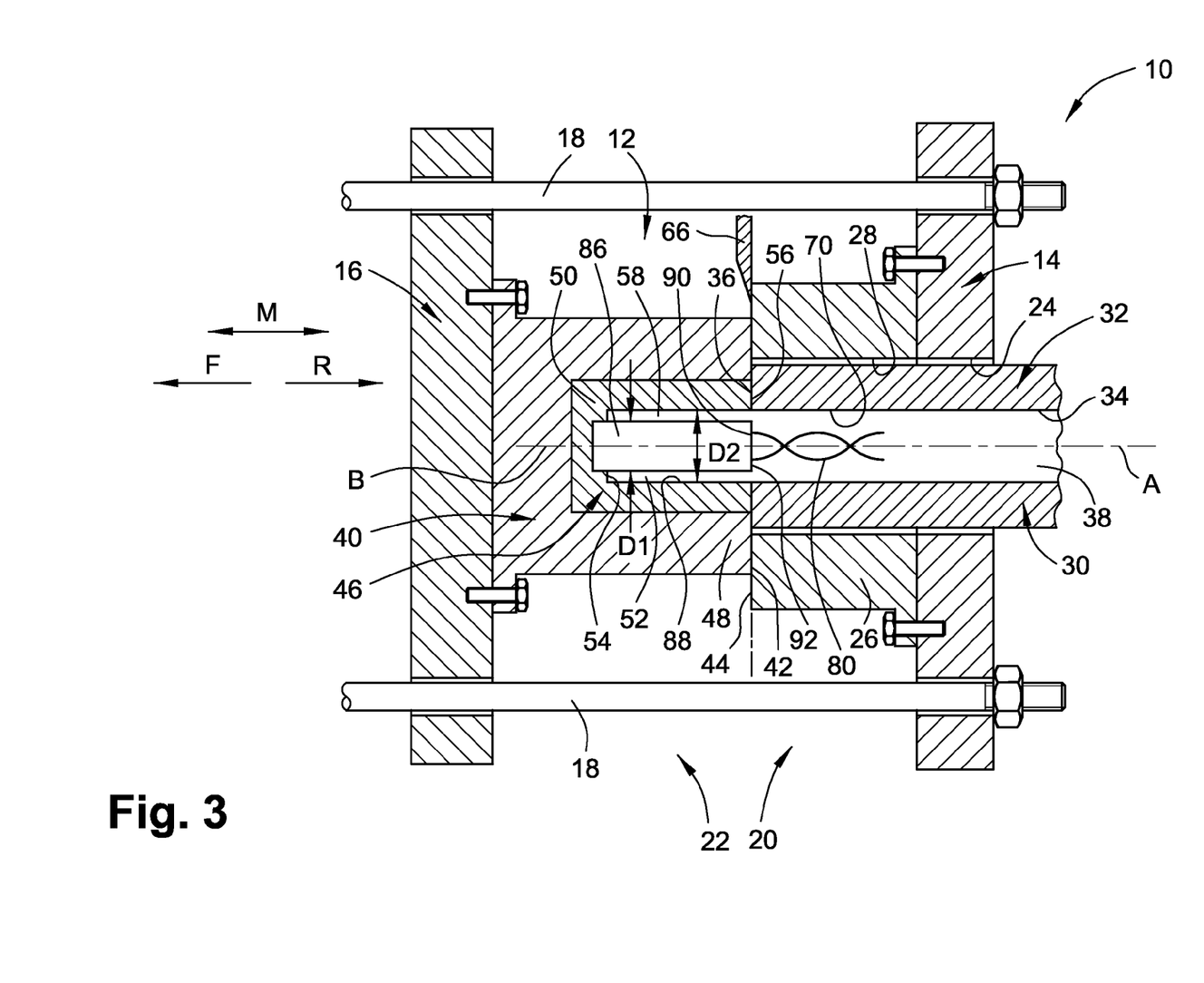
FIG. 3 is a schematical cross-sectional view of an injection and extruding system in accordance with the present invention during the injection process of producing a cutting tool having cooling channels and a shank bore.

In some cases, when the cutting tool 62 has to be provided with internal cooling channels 78 (see FIGS. 5 and 6), the die 30 is further provided with pins 80 that extend along the die bore 34 and rearwardly from the forward portion 70 thereof (see FIGS. 3 and 4). The pins 80 are fixed within the die bore 34 and reach the parting line PL.

If the cooling channels are to be straight, then, the pins 80 are also straight. If the cooling channels are to be helically twisted, then, a front portion of the pins 80 is also helically twisted within the die bore 34, as shown in FIG. 3. The pins 80 are connected to the die body 32, typically at a rear portion of the pins 80, by methods known in the art.

In a case when it is desired to produce a shank 60 having a bore 82 that opens to a rear end 84 of the shank 60, then, the cavity insert 46 is further provided with a suitable core 86 that is connected to the insert bore bottom 54.

An advantage of an injection and extrusion process according to the present invention may be particularly implemented when it is desired to form an economical shank construction that may have a large bore 82 at its rear end 84 thus saving a substantial amount of tool material 38. The large bore 82 may be used also for the passage of a cooling medium therethrough toward the cutting portion 124 of the cutting tool 62, by means of internal cooling channels 78 that extend forwardly from a front end 112 of the bore 82. A further advantage of the large bore 82 is the fact that its connection with the cooling medium supply becomes much easier instead of having to connect the cooling supply to much thinner internal cooling channels 78.

In such a case, when the cavity insert 46 is provided with a core 86 (see FIGS. 3 and 4), the core 86 extends rearwardly from the insert bore bottom 54. The core has a core diameter D1 that is smaller than a cavity diameter D2 of the cavity insert 46. Thus, during the injection process, the tool material 38 fills the space between the core 86, the walls 88 of the cavity insert 46 and the insert bore bottom 54.

In this manner, and advantageously over the prior art, the shank 60 is formed, having a large bore 82 and a relatively thin wall thickness L1. The green body of the shank 60 has a shank diameter D3, and, the bore 82 has a bore diameter D4. The shank diameter D3 may be equal to the cavity diameter D2, and, the bore diameter D4 may be equal to the core diameter D1. The meaning of the term "large" with respect to the bore 82 means that a diameter ratio E between the bore diameter D4 and the shank diameter D3 is relatively large. Typically, the diameter ratio E may be in the range of 0.6 to 0.9. For example, a drill having a shank diameter D3 of 3 mm may be provided with a bore 82 having a bore diameter D4 of 2 mm, whereas, a drill having a shank diameter D3 of 20 mm may be provided with a bore 82 having a bore diameter D4 of 16 or 18 mm, corresponding to a wall thickness L1 of 2 mm or 1 mm.

The diameter ratio E is not defined with respect to the cutting tool only and it may be equally defined with respect to the cavity insert. Hence, the diameter ratio E is also the ratio between the core diameter D1 and the cavity diameter D2.

Despite the above examples, it is understood that a cutting tool or a process for making such a cutting tool according to the present invention is not limited to the dimensions described above and other dimensions may be chosen. For example, the shank diameter D3 of the cutting tool may be also smaller than 3 mm or larger than 20 mm. Furthermore, the diameter ratio E is not limited to the range of 0.6 to 0.9, and higher or lower ratios may be chosen.

The large bore 82 introduces several advantages. First, it enables much easier connection of a cooling supply at the rear end 84 of the shank 60. Second, it enables to save a large amount of cemented carbide, and hence, money, compared to prior art cutting tools. Furthermore, these advantages are obtained through a continuous and uninterrupted process without necessity of further production processing, such as, for example, wire cutting of the cemented carbide in order to produce a large bore at the rear end of the shank.

In embodiments in which the fluted portion 64 is provided with an internal cooling channel or channels 78, the die 30 is provided, as described above, with a pin or pins 80 that extend rearwardly from the forward portion 70 of the die bore 34. In such embodiments, in the first step of the process, when the movable plate 16 is forcibly held against the fixed plate 14 along the parting line PL, a forward end 90 of the pin or pins 80 is held in contact with a rear end 92 of the core 86. This is done in order to ensure that at the end of the injection and extrusion process, a continuous path for a cooling medium is formed from the rear end 84 of the shank 60 to a front portion 74 of the cutting tool 62 (see FIG. 5).

In the embodiment shown in FIGS. 5 and 6, the shank 60 of the cutting tool 62 has a shank diameter D3 and the fluted portion 64 has a fluted portion diameter D5, that is slightly smaller than the shank diameter D3. However, the fluted portion diameter D5 does not have to be smaller than the shank diameter D3 and it may be equal to, or larger than, the shank diameter D3.

When it is desired to produce the shank diameter D3 larger than the fluted portion diameter D5, then, the cavity diameter D2 is larger than a die bore diameter D6 (see FIG. 1). Alternatively, when it is desired to produce the shank diameter D3 smaller than the fluted portion diameter D5, then, the cavity diameter D2 is smaller than the die bore diameter D6.

The injection and extrusion process according to the present invention may be particularly useful for the production of cemented carbide drills having, typically two, helical flutes 76, and internal cooling channels 78. In such a case, the die will be provided with two spiral pins 80. However, according to the present invention, the cutting tools produced according to the injection and extrusion process may equally have other number of helical flutes, for example, three or four, by changing the cross-section of the die bore 34. In such a case, if the cutting tool is provided with internal cooling channels that correspond to the number of the flutes, then, the die is provided with pins in a number that corresponds to the number of the internal cooling channels.

The process for making a cutting tool according to the present invention may be beneficial when it is required to make the cutting tool with regions having a different structure. Specifically, the present invention teaches how to make a cutting tool with two different regions, wherein an inner region is only partially covered by an outer region.

Figure 7:
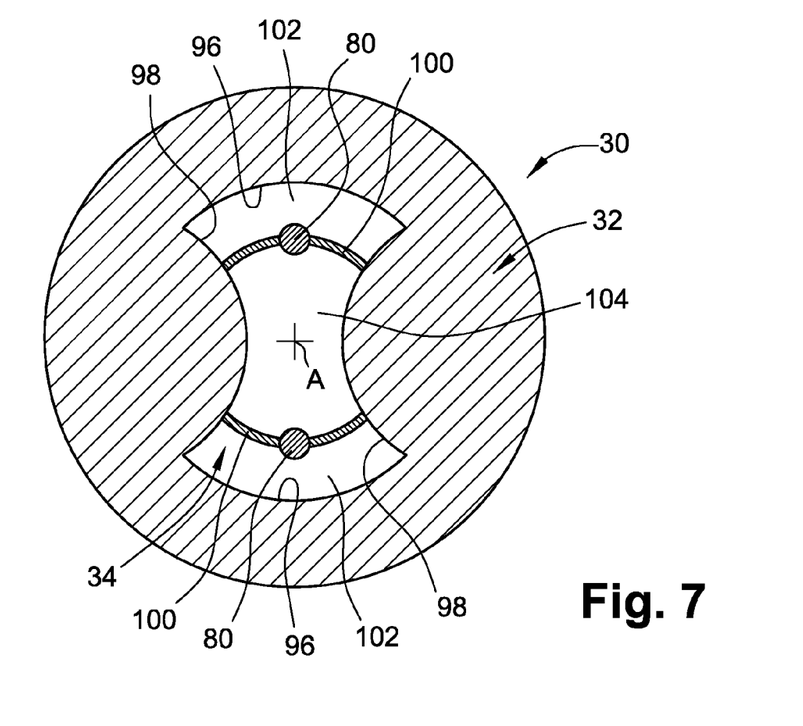
FIG. 7 is a cross-sectional view of a die according to the present invention that enables forming a cutting tool having different material properties adjacent a flute peripheral portion.

FIG. 7 shows a cross-section of one embodiment of a die 30 according to the present invention. The die 30 comprises a die bore 34 formed within a die body 32. Two pins 80 extend along the die bore 34 up to a forward portion 70 of the die bore 34.

The die 30 may be used for making a twist drill 94 having internal cooling channels 78, as shown in FIG. 5. The die bore 34 has two opposed die bore peripheral portions 96, and two die bore convex portions 98 therebetween. Clearly, the shape of the die bore 34 corresponds to the shape of the cutting tool 62 being produced, and the present invention is not limited to the shape described herein. Thus, for example, there may be another number of die bore peripheral portions and die bore convex portions, for example, one, three, or more. The number of the internal cooling channels may be equal to the number of the die bore peripheral portions, or, may differ therefrom. The die bore convex portions may have a different shape rather than convex.

Separation plates 100 extend between each of the pins 80 to the die bore convex portions 98. The separation plates 100 extend from a rear portion of the pins 80 and they may extend up to the forward portion 70 of the die bore 34. However, the separation plates 100 do not have to extend up to the forward portion 70 of the die bore 34, and they may end at a point that is rearward to the forward portion 70 of the die bore 34. The separation plates 100 generally follow the path of the pins 80, namely, if the pins 80 extend linearly, then, also the separation plates 100 extend linearly, whereas, if the pins 80 extend spirally, then, also the separation plates 100 extend spirally.

The connection between the pins 80 and the separation plates 100 adds rigidity to the pins 80 and increases the accuracy of their position, and thereby also increases the accuracy of the cooling channels 78 and of the entire cutting tool 72 produced according to the present invention. The separation plates 100 do not have to be connected to the center of the pins 80 as shown in FIG. 7. Thus, in some embodiments, the separation plates 100 are connected at the side of the pins 80 that are closest to the longitudinal axis A of the die bore 34. In other embodiments, the separation plates 100 are connected at the side of the pins 80 that are remote from the longitudinal axis A of the die bore 34.

Furthermore, the separation plates 100 do not have to be connected to the pins 80. Thus, in some embodiments, each of the separation plates 100 is located between a pin 80 and the longitudinal axis A of the die bore 34. In other embodiments, each of the pins 80 is located between a separation plate 100 and the longitudinal axis A of the die bore 34.

During the extrusion stage, two different mixtures are inserted into the die bore 34. A first mixture is inserted into a first chamber 102 formed between each of the separation plates 100 and a corresponding die bore peripheral portion 96. A second mixture is inserted into a second chamber 104 formed between the separation plates 100.

When the two different mixtures are extruded beyond the die front end 36, they merge with each other, forming a green body having different properties at different portions thereof. Typically, the mixture at the first chamber 102 is harder and more wear-resistant than the mixture at the second chamber 104, wherein the mixture at the second chamber 104 is typically tougher than the mixture at the first chamber 102. Thus, advantageously, a cutting tool can be formed, having different properties at different portions thereof, wherein the inner material is only partially covered by the outer material.

According to one embodiment of the present invention, during the injection stage, only the second mixture found at the second chamber 104 is injected into the mold 58. Then, during the extrusion stage, the two mixtures are co-extruded, thus forming a fluted portion 64 having different properties at different portions thereof. Thus, a major portion of the cutting tool 62, including the shank 60, is formed from a tough material, and, the cutting portion of the cutting tool 62, at regions remote from the longitudinal axis C of the cutting tool 62, is formed from a hard and wear-resistant material.

In some embodiments, it is required that only a portion of the cutting tool 62 in the vicinity of a land 106 be formed from a hard and wear-resistant material. In a case of an end mill, for example, this requirement applies to the vicinity of the cutting edge that extends spirally rearwardly from the front portion 74 of the cutting tool 62.

Figure 8:
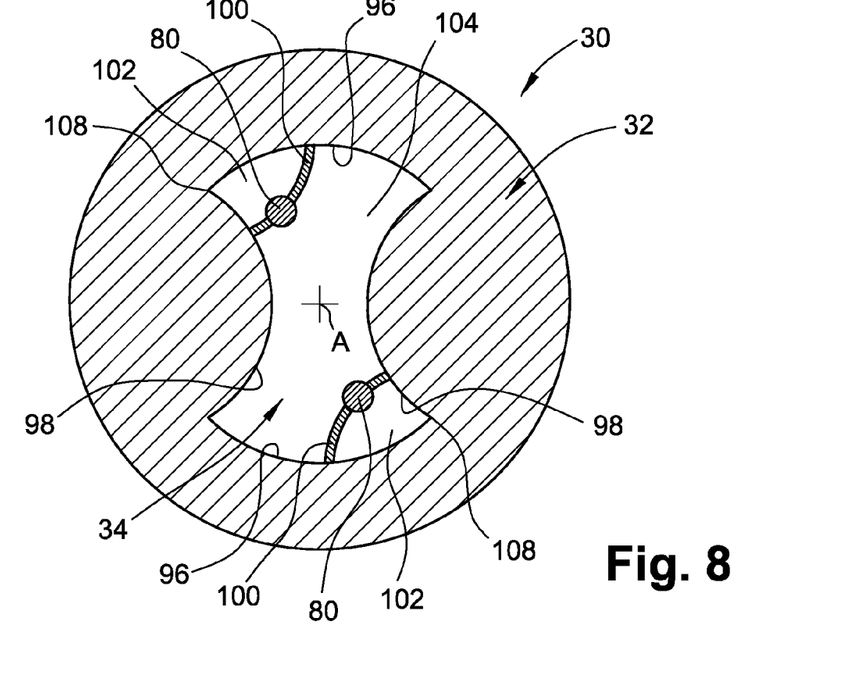
FIG. 8 is a cross-sectional view of a die according to the present invention that enables forming a cutting tool having different material properties adjacent a leading edge of a flute peripheral portion.

In such case, as shown in FIG. 8, each of the separation plates 100 extends from a die bore peripheral portion 96 to one adjacent die bore convex portion 98 thus forming an enclosed first chamber 102 in the vicinity of only one bore edge 108 of the die bore 34 that is formed between a die bore peripheral portion 96 and a die bore convex portion 98.

Thus, when a cutting tool 62 is produced by means of the die 30 shown in FIG. 8, the hard and wear-resistant material extruded through the first chamber 102 makes the cutting edge and its vicinity harder than the rest portions of the cutting tool 62. As can be further seen in FIG. 8, the pins 80 are not located symmetrically with respect to the die bore convex portions 98, rather, they are located closer to the bore edge 108 that corresponds to a cutting edge of the cutting tool. In this manner, it is guaranteed that the internal cooling channel 78 will be closer to the cutting edge, thus more efficiently cooling the cutting zone that comes in contact with the workpiece during machining This results in easier cutting, better cooling, prolonged tool life and more economical cooling process.

Figure 9:
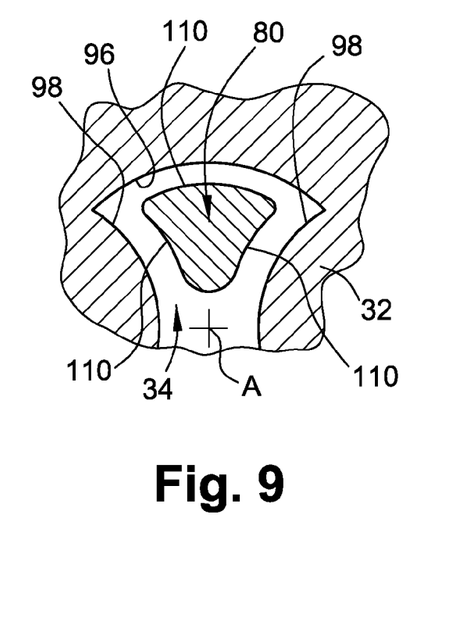
FIG. 9 is a cross-sectional view of a die having a non-round pin.

In some embodiments, as shown for example in FIG. 9, the pin 80 does not have a circular cross-section as shown in FIGS. 7 and 8. Rather, the pin 30 has a cross-section having border lines 110 that are generally parallel to the adjacent walls of the die bore 34, i.e., to a given die bore peripheral portion 96 and to the die bore convex portions 98.

Such a construction of the pin 80 enables the internal cooling channel to be formed such that the cooling is evenly spread along the periphery of the cutting tool thus making the cooling more efficient and the tool's life may be prolonged.

Figure 10:
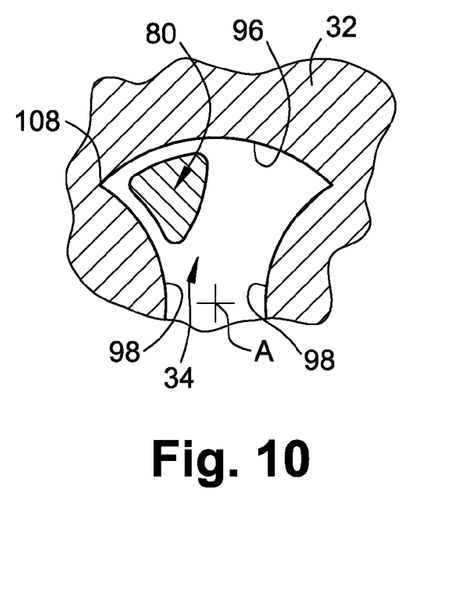
FIG. 10 is a cross-sectional view of a die having a pin that is not symmetrical with respect to the die bore convex portions.
Figure 11:
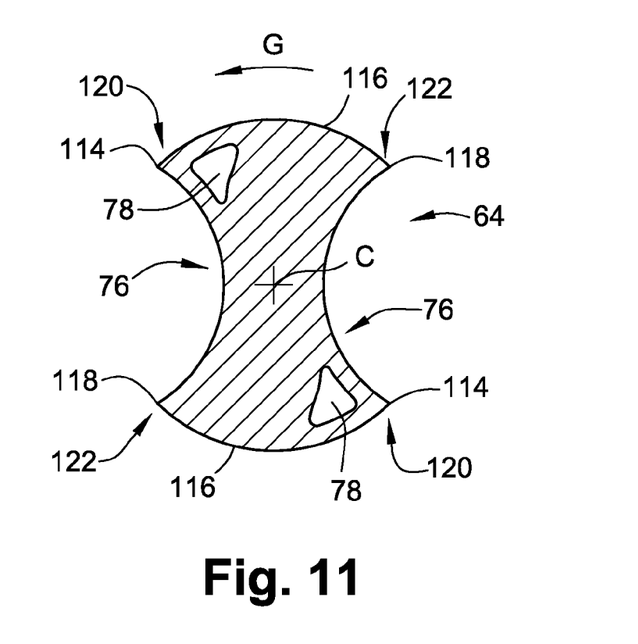
FIG. 11 is a cross-sectional view of the cutting tool taken along line XI-XI in FIG. 5.

FIG. 10 shows another embodiment wherein the pin 80 is not symmetrical with respect to the die bore convex portions 98. In this case, the pin 80 is located closer to a bore edge 108. As a consequence, as shown in FIG. 11, the cutting tool 62 will have internal cooling channels 78 that are closer to a flute leading edge 114 of a flute peripheral portion 116 than to a flute trailing edge 118 of the flute peripheral portion 116, as seen in a cross-section taken in a plane perpendicular to the longitudinal axis C of the cutting tool. The flute leading edge 114 is formed, with respect to a direction of rotation G, at a leading end 120 of the flute peripheral portion 116, at the intersection of the flute peripheral portion 116 with a flute 76. The flute trailing edge 118 is formed at a trailing end 122 of the flute peripheral portion 116, at the intersection of the flute peripheral portion 116 with an opposite flute 76.

Thus, the cooling agent that will flow in the internal cooling channel of the cutting tool will be in the region of the cutting edge where most of the heat is generated. In this manner, the cooling will be more efficient and economical since cooling of unnecessary portions of the cutting tool will be advantageously avoided. Thus, while prolonging the tool's life, cooling expenses can be reduced.

Although the present invention has been described to a certain degree of particularity, it should be understood that various alterations and modifications could be made without departing from the spirit or scope of the invention as hereinafter claimed.

The shank may be produced without the large cooling bore, when instead, the internal cooling channels in the fluted section may extend also through the shank to the rear end of the shank. In that case, the cavity insert may be provided with cavity pins that extend from the insert bore bottom, rearwardly, up to the pins that are formed within the die.

If the internal cooling channels of the shank are to be straight, then, also the cavity pins are straight and the shank is ejected from the cavity insert in a linear motion parallel to the cavity pins. If the internal cooling channels of the shank are to be twisted, then, also the cavity pins are twisted and the shank is ejected from the cavity insert in a twisted manner that follows the twist of the cavity pins.

The process for making a cutting tool according to the present invention is not limited to the production of monolithic tools only. It may be appreciated by a person skilled in the art that, while the shank and the fluted portion of the cutting tool have monolithic construction, a front portion of the cutting tool may be separately produced, and, connected to the fluted portion. Thus, for example, the front portion of the cutting tool may be a holder that retains cutting inserts therein. The holder then may be connected to the fluted portion by a method known in the art, such as a bayonet connection or by brazing. Furthermore, the front portion of the cutting tool may be a cutting head of, for example, a reamer that is produced through a different process like, for example, form pressing or injection molding, as known in the art. Then, the cutting head may be connected to the front portion of the fluted portion by methods known in the art.

The cutting portion of the cutting tool does not have to extend axially with the fluted portion. Rather, the cutting portion may extend radially outwardly from the fluted portion, as required, for example, in some kinds of tools for internal turning or internal grooving. In such cases, the cutting portion may be formed by the injection stage and the fluted portion by the extrusion stage.

The bore that extends forwardly from the rear end of the shank does not have to be cylindrical and symmetrical with respect to the longitudinal axis C of the cutting tool. Thus, in other embodiments, the bore has a non-round cross-section taken in a plane perpendicular to the longitudinal axis C of the cutting tool.

The process according to the present invention may be applicable to cutting tools made of cemented carbides, ceramics, HSS, or any other suitable material.

The fixed portion may comprise the cavity insert instead of the die, and, accordingly, the movable portion may comprise the die instead of the cavity insert.

What is claimed is:

1. A process for making a cutting tool having a shank (60) and a fluted portion (64), comprising:
   forming a cutting tool green body by:
   injection molding, into a cavity, a shank of the green body; and
   extruding, through a die, a fluted portion of the green body while separating the die and the cavity, such that the shank and the fluted portion have a monolithic construction; and
   sintering the cutting tool green body.

2. A process for making a cutting tool having a shank (60) and a fluted portion (64), comprising:
   providing an injection and extrusion system (10) comprising:
   a fixed portion (20); and
   a movable portion (22) that contacts the fixed portion (20) and is capable of moving away from the fixed portion (20) along a bidirectional movement direction (M); wherein:
   one of the fixed and movable portions comprises a die (30) having a die bore (34) with a longitudinal axis (A), the die bore facing along the movement direction (M); and
   the other of the fixed and movable portions comprises a cavity insert (46) having a longitudinal axis (B) and an insert bore (52) that faces the die bore (34);
   forming a cutting tool green body by:
   (i) injecting molten tool material (38) through the die bore and into the insert bore, thus forming a shank (60) of the cutting tool green body;
   (ii) moving the movable portion away from the fixed portion, and, simultaneously, extruding molten tool material through the die bore, thus forming a desired length (L) of a fluted portion (64) of the cutting tool green body, such that the shank and the fluted portion have a monolithic construction; and
   (iii) cutting the fluted portion; and
   sintering the cutting tool green body.

3. The process according to claim 2, further comprising the steps of:
   prior to sintering the green body, ejecting the shank (60) from the insert bore (52).

4. The process according to claim 2, wherein:
   the insert bore (52) comprises a core (86) that extends rearwardly from an insert bore bottom (54).

5. The process according to claim 4, wherein:
   the core (86) has a core diameter (D1);
   the insert bore (52) has a cavity diameter (D2); and
   a diameter ratio (E) between the core diameter (D1) and the cavity diameter (D2) is in the range of 0.6 to 0.9.

6. The process according to claim 2, wherein:
   the die bore (34) comprises die bore portions that are twisted along the die bore; and
   the cavity insert (46) is rotatable around its longitudinal axis (B), with respect to whichever of the fixed portion (20) and the movable portion (22) it belongs.

7. The process according to claim 6, wherein:
   the cavity insert (46) is forcibly rotatable.

8. The process according to claim 2, wherein:
   the die bore (34) comprises at least one pin (80) that extends rearwardly from a forward portion (70) of the die bore.

9. The process according to claim 8, wherein:
   the at least one pin (80) is twisted at least along a front portion thereof.

10. The process according to claim 8, wherein:
    a cross-section of the at least one pin (80), taken in a plane perpendicular to the longitudinal axis (A) of the die bore (34), is not round.

11. The process according to claim 8, wherein:
    the die bore (34) comprises a die bore peripheral portion (96) associated with the at least one pin (80);

the die bore peripheral portion merges with a first die bore convex portion (98) at a first bore edge (108) and with a second die bore convex portion at a second bore edge; and the at least one pin is closer to the first bore edge than to the second bore edge.

12. The process according to claim 8, wherein:
the die bore (34) comprises a die bore peripheral portion (96) associated with the at least one pin (80);
the die bore peripheral portion merges with a first die bore convex portion (98) at a first bore edge (108) and with a second die bore convex portion at a second bore edge;
a first chamber (102) is defined between the die bore peripheral portion and a separation plate (100) that is connected to at least one die bore convex portion;
a second chamber (104) is defined between the separation plate and the longitudinal axis (A) of the die bore; and
the first chamber is connected to an intake of a first tool material (38) and the second chamber is connected to an intake of a second tool material.

13. The process according to claim 12, wherein:
the first tool material (38) is different from the second tool material.

14. The process according to claim 13, wherein:
the first tool material (38) is harder than the second tool material; and
the second tool material is tougher than the first tool material.

15. The process according to claim 13, wherein:
at least a portion of a length of the fluted portion is made from the first tool material and a remaining portion of the length of the fluted portion is made from the second tool material.

16. The process according to claim 12, wherein:
the separation plate (100) is connected to the at least one pin (80).

17. The process according to claim 12, wherein:
the first chamber (102) comprises the first bore edge (108) and the second bore edge.

18. The process according to claim 12, wherein:
the first chamber (102) comprises the first bore edge (108); and
the second chamber (104) comprises the second bore edge.

19. The process according to claim 12, wherein:
the first chamber (102) comprises the at least one pin (80).

20. The process according to claim 12, wherein:
the second chamber (104) comprises the at least one pin (80).

21. The process according to claim 2, wherein:
the insert bore (52) has a cavity bore diameter (D2);
the die bore (34) has a die bore diameter (D6); and
the cavity bore diameter (D2) equals the die bore diameter (D6).

22. The process according to claim 2, wherein:
the insert bore (52) has a cavity bore diameter (D2);
the die bore (34) has a die bore diameter (D6); and
the cavity bore diameter (D2) differs from the die bore diameter (D6).

23. A process according to claim 2, wherein:
the fixed portion comprises the die; and
the movable portion comprises the cavity insert.

24. A process according to claim 2, wherein:
the fixed portion comprises the cavity insert; and
the movable portion comprises the die.

25. A process for making a cutting tool green body having a shank and a fluted portion, comprising:
injection molding, into a cavity, a shank of the green body; and
extruding, through a die, a fluted portion of the green body while separating the die and the cavity, such that the shank and the fluted portion have a monolithic construction.

* * * * *